United States Patent [19]
Fitton

[11] 3,915,734
[45] Oct. 28, 1975

[54] MODIFIED PRECIPITATED ALUMINO SILICATE PIGMENTS AND METHOD FOR PREPARING SAME
[75] Inventor: Robert C. Fitton, Belair, Md.
[73] Assignee: J. M. Huber Corporation, Locust, N.J.
[22] Filed: Mar. 15, 1974
[21] Appl. No.: 451,619

Related U.S. Application Data
[63] Continuation-in-part of Ser. No. 198,022, Nov. 5, 1971, Pat. No. 3,798,046.

[52] U.S. Cl. .............................. 106/306; 106/288 B
[51] Int. Cl.² ........................................... C09C 1/02
[58] Field of Search ..................... 106/288 B, 306

[56] References Cited
UNITED STATES PATENTS

| | | | |
|---|---|---|---|
| 2,739,073 | 3/1956 | Bertorelli | 106/288 B |
| 2,786,776 | 3/1957 | Allen | 106/306 |
| 2,848,346 | 8/1958 | Bertorelli | 106/288 B |
| 3,034,913 | 5/1962 | Lagerstrom | 106/306 |
| 3,424,602 | 1/1969 | Nauroth | 106/288 B |
| 3,582,379 | 6/1971 | Hackbarth et al. | 106/288 B |
| 3,784,442 | 1/1974 | Hackbarth et al. | 106/288 B |

Primary Examiner—Delbert E. Gantz
Assistant Examiner—James W. Hellwege
Attorney, Agent, or Firm—Harold H. Flanders; Donald S. Lilly

[57] ABSTRACT

An improved method for producing novel alkali aluminum silicate particulates modified with, and containing a chemically bound alkaline earth metal, is disclosed. The alumino silicate pigments contain an alkaline earth metal, preferably calcium, magnesium, or barium in addition to an alkali metal, such as sodium. The pigments are prepared by introducing dilute solutions of an alkali silicate and an aluminum salt of a mineral acid into an agitated aqueous receiving medium containing an alkaline earth salt or hydroxide and sodium sulfate. The pH of the fluid reaction medium may be controlled to form finely divided precipitated particulates having improved properties and which may be used as pigments in paper, in paint, in rubber, and the like.

7 Claims, No Drawings

MODIFIED PRECIPITATED ALUMINO SILICATE PIGMENTS AND METHOD FOR PREPARING SAME

REFERENCE TO COPENDING APPLICATIONS

The present application is a continuation-in-part of U.S. Ser. No. 198,022, filed Nov. 5, 1971, now U.S. Pat. No. 5,798,046 which is issued Mar. 19, 1974.

BACKGROUND OF THE INVENTION

1. Filed of the Invention

The present invention relates to finely divided precipitated silicate pigments and, more particularly, to a unique method for preparing modified sodium alumino silicate pigments which are chemically analagous to zeolites but which have greatly improved properties and characteristics.

2. Description of the Prior Art

As is well known in the art, natural alkali metal zeolites such as natrolite and analcine are known to possess water softening properties but have limited usefulness as pigments. In recent years a number of artificial or synthetic zeolites containing sodium, aluminum and silicone oxides, in various proportions, have been proposed and synthesized. Examples of synthetic zeolites are disclosed in U.S. Pat. Nos. 2,882,243; 2,962,355; 2,996,358; 3,010,789, 3,011,869; and 3,012,853. To a large extent, known synthetic zeolites lack the essential characteristics of pigments and have found limited use in this field.

In this regard, however, there has been developed a novel precipitated sodium alumino silicate that has particular use as pigments in paper coatings, as fillers in rubber compounds, in inks, paints, plastics and the like. Such pigments are commercially available and are manufactured and sold under the trademark "Zeolex" by J. M. Huber Corporation. While Zeolex pigments contain the essential oxide components of natural and synthetic products, these pigments are precipitated products of alumina and silica and contain chemically bound sodium and as such as readily distinguishable from gels and other synthetically produced materials. In general, these pigments are precipitated amorphous materials and are composed of particles having ultimate sizes of only a few hundredths of a micron in diameter which tend to cling together in clusters of up to about 1 micron in diameter. In chemical composition, they typically contain $Na_2O$ and $Al_2O_3$ in a molar ratio near to 1, as in the range of about 0.8 to 1.2 mols of $Na_2O$ per mol of $Al_2O_3$, together with silica which can be present in any of various selected concentrations ranging from as little as about 2.5 mol to as much as about 16 mols of $SiO_2$ per mol of $Al_2O_3$.

As will be discussed in more detail hereinafter, these pigments are advantageously prepared (see e.g., U.S. Pat. No. 2,739,073 by comingling dilute solutions of an alkali silicate and an aluminum salt, such as aluminum sulfate. In a preferred embodiment, an amount of water not greater than about one half of the volume of the solutions to be added is placed in a suitable reaction vessel provided with a strong agitator. The reactants, i.e., the dilute solutions of the alkali silicate and an aluminum salt, are then introduced in streams entering the water at widely spaced points. In U.S. Pat. No. 2,848,346 such pigments are prepared by comingling a dilute solution of an alkali silicate and a dilute solution of a dispersion containing finely divided silica and aluminum sulfate. The latter is prepared by treating kaolin clay with a strong mineral acid, such as sulfuric acid.

SUMMARY OF THE INVENTION

In summary, the present invention is directed to the production of novel modified sodium alumino silicate pigments. In its broadest aspects, the invention is characterized and embodies the concept of producing a pigment having significantly improved properties by introducing an alkali metal silicate and an aluminum salt into an agitated receiving medium which contains an alkaline earth metal salt, such as magnesium sulfate, and as a promoter or catalyst, sodium sulfate. It has been discovered that products produced in this manner, as will be described in more detail hereinafter, contain chemically bound sodium, (i.e., the alkali metal) as well as the chemically bound alkaline earth metal. As such, the products are readily distinguishable from so-called co-precipitates which contain mere mixtures of, e.g., an alkali metal alumino silicate and an alkaline earth metal alumino silicate.

From the above and as will be evident from the following detailed description, the present invention provides a truly unique and simplified process for preparing novel alkaline earth metal modified synthetic products having greatly improved properties. As noted above, the sodium sulfate serves as a promoter or catalyst and serves to enhance the reaction rate and overall reaction mechanism to the extent that a given end product, that is, one with predetermined properties, can be reproduced repeatedly or consistently.

It is accordingly a general object of the present invention to provide a highly efficient and improved method for preparing finely divided precipitated alkaline earth-alkali metal alumino silicate pigments.

Yet another object is to provide novel modified sodium alumino silicate particulates which have particular utility for use in paper, but which may be also advantageously employed as reinforcing pigments or fillers in rubber, in paints, and the like.

Still another object is to provide an improved method for preparing modified silicate pigments, said method being characterized by its high flexibility in producing a product of a given or predetermined property or characteristic.

Yet still another object is to provide an economical and practical method for producing modified sodium alumino silicate pigments having greatly improved properties, said method not being subject to the disadvantages and complexities involved in prior known techniques.

The manner in which the foregoing and other objects are achieved in accordance with the present invention will be better understood in view of the following detailed description wherein particularly advantageous method and composition embodiments are disclosed for illustrative purposes.

DESCRIPTION OF PREFERRED EMBODIMENT(S)

In accordance with the present invention, it has been discovered that novel alkaline earth metal modified alkali metal alumino silicate pigments can be prepared by introducing dilute solutions of an alkali metal silicate and a water soluble acid salt of aluminum (such as aluminum sulfate) into an aqueous reaction media containing dispersed therein an alkaline earth metal salt or hydroxide and as a promoter or catalyst, sodium sulfate. The invention is based, in part, on the discovery that if the dilute solutions of the alkali metal silicate and the aluminum sulfate are added to a reaction mass that contains the alkaline earth metal salt or hydroxide, the latter serves as a nucleus or nucleating agent which alters the structure of the resulting modified zeolitic type pigment.

The products of the invention are compositions containing essentially the oxides of an alkaline earth metal, an alkali metal, aluminum and silicon, that may be represented by the general formula

$$a\ X_2O\ .\ b\ Al_2O_3\ .\ c\ YO\ .\ d\ SiO_2\ .\ e\ H_2O$$

wherein X is an alkali metal such as sodium or potassium and Y is an alkaline earth metal of Group 2a of the Periodic Table. The alkaline earth metal is preferably magnesium or calcium. The small letters, i.e., $a$, $b$, ... $e$, represent the mols of the oxides present in the total composition. As briefly discussed above, the mol ratio of the constituent oxides may vary widely with the molar ratio of $Na_2O$ to $Al_2O_3$ preferably being near to 1, such as about 0.8 to 1.4 mols of $Na_2O$ per mol of $Al_2O_3$. The mols of $SiO_2$ to $Al_2O_3$ can be as low as about 2.5 mols up to as much as about 24 mols of $SiO_2$ per mol of $Al_2O_3$. The molar ratio of the alkaline earth oxide (YO) to $Al_2O_3$ can be varied from about 0.1 to 3, preferably from about 1.0 to 1.5. From the above, however, it should be readily understood that a change in the molar ratio of any given two oxides will vary the ratio of one such oxide to another, i.e., a third oxide in the composition. To this end it is more simply stated that the alkaline earth metal salt is added to the reaction medium in an amount such that the alkaline earth metal oxide comprises from about 0.1 to 30% of the dry weight of the pigment, based on the particular alkaline earth metal salt used. For example if a magnesium salt is employed, the range of the resulting MgO would be about 0.1 to 8.0%. With this parameter the other constituents or reactants, e.g., the alkali metal silicate, can be added in an amount to give the desired molar ratio of $Na_2O$ to $Al_2O_3$, etc..

The precipitated products have been found to have particle sizes substantially the same as the above discussed Zeolex pigments, i.e., all less than one micron in diameter and moreover are characterized by increased brightness (when used in paper) and other qualities as will be discussed in more detail hereinafter.

In practicing the method of the present invention, the solutions of the aluminum salt and the alkali metal silicate are maintained at very low concentrations and under strong agitation during the process of comingling and reacting them together in the body of the reaction mass containing the nuclei, i.e., the alkaline earth salt or hydroxide and the promoter or catalyst, sodium sulfate.

In accordance with a first method embodiment of the present invention, the dilute solutions of the reactants are charged slowly into the diluting aqueous medium containing the alkaline earth metal salt and are preferably introduced at widely spaced locations therein. The reaction mass is continuously and vigorously stirred or agitated throughout the reaction so as to keep the dispersion in a fluid condition. The alkali metal silicate solutions so used should be about 2 molar or lower concentration, and the concentration of the solution of the aluminum salt should also be about 2 molar or lower concentration.

The reaction medium, i.e., the body of water containing the alkaline earth salt, should preferably be about half that of the combined volumes of the silicate solution and aluminum salt solution. In this regard, the concentration of the solutions in the reaction mass should average less than about 2.0 molar, depending somewhat upon the particular reactants employed, their purity and other variables. Preferably the reacting concentration is maintained at not more than about 1.0 molar. The dilute solutions of the reactants are introduced into the reacting media at widely spaced points so that a high degree of dilution of each solution is assured. For example, one solution may be added to the vortex created by the agitator blade, while the other solution is added near the wall of the vessel. Alternately, the two solutions may be introduced into the reaction vessel at different levels as, e.g., one below the surface with the other being near or above the surface, etc. Although the reaction mass may thicken somewhat as the precipitation proceeds, at the end of the reaction it is a fluid mass from which the precipitated solid products of the invention may be easily separated.

In general, the addition of the silicate and aluminum salt can be started simultaneously or a portion of the silicate can be added prior to the addition of the aluminum salt. The pH of the reaction should be maintained between about 8 to 12, preferably from between about 8 and 10, until all of the alkali silicate has been added. The addition of the aluminum salt solution may then be continued until the pH is reduced to between about 8 and 10.0. While the precipitation of the product of the invention can be executed by the simultaneous addition of the alkali silicate solution and the aluminum salt solution, it has been found to be particularly advantageous to add a portion of the solution of the alkali metal silicate (such as sodium meta or disilicate) to the receiving medium prior to the introduction of the solution of the aluminum salt. It is not understood how this affects the mechanics of the reaction or precipitating process other than perhaps affecting the nucleation effect of the alkaline earth metal salt. However, products produced in accordance with the second method embodiment have further improved properties, particularly with regard to their brightness and their optical properties in paper.

The concentration of the sodium sulfate in the aqueous reaction medium, which also contains the alkaline earth salt, should be within the range of from about 2 to 15% by weight based on the weight of the water forming said reaction medium.

In practicing the second method embodiment, the sodium silicate solution is added to the reaction or receiving media until the pH of the aqueous mass is between 8 and 10. Thereafter the solutions of the sodium silicate and the aluminum salt are added simultaneously to the reaction mass until such time as the total amount of the aluminum salt solution has been added. After the aluminum salt solution has been added, the addition of the silicate solution is continued until the pH of the reaction mass is between about 8.0 to 10.0.

Upon completion of the reaction procedure, the precipitated pigment is usually separated from the reaction liquid by filtration, but other means of separation, such as centrifuging, can be used. In general it is preferable to wash the separated pigment with water to remove water soluble salts and the like. The resulting filter cake is then dried in any suitable manner. The drying is preferably performed at elevated temperatures with the temperature of the drying step being used to control the percent of the water of the finished pigment. For example, when dried at about 105°C, the pigments usually contain from about 7 to 12 percent water.

It should also be understood that the amount of water remaining in the precipitated pigment depends upon the time, temperature and other conditions of drying. It is not possible to express conditions which will be required for drying a particular pigment with any degree of exactness. This will vary to a large extent, depending, e.g., upon the degree of air circulating through the pigment, the type of drying apparatus, etc. As recognized by those skilled in the art, there is a substantial difference in the manner in which "free water" and "bound water" are held in pigment compositions. Bound water appears to be chemically combined with the silicate pigment. For this reason bound water does not readily come off unless dried at temperatures on the order of about 300°C. On the other hand, free water comes off readily upon drying at relatively moderate temperatures i.e., up to about 105°C.

As discussed above the starting materials or reactants employed in the present invention include alkali metal silicate, the alkaline earth salts or hydroxides and aluminum salts. As used herein, the term alkali metal silicates include all the common forms of alkali metal silicates as, for example, metasilicates, disilicates and water glass. Water soluble potassium silicates and sodium silicates are particularly advantageous. Because of their relatively low cost, sodium silicates are preferred. If employed, sodium silicates are effective in any composition in which the ratio of the $SiO_2$ to $Na_2O$ is from about 1 to 3.3:1.

The aluminum salts useful in the method of the invention are the water soluble acid salts of aluminum such as aluminum sulfate, aluminum chloride, aluminum nitrate and ammonium alum (aluminum ammonium sulfate). Additionally, the aluminum sulfate solution that is added to the reaction mass may comprise an aqueous slurry of a finely divided precipitated silica suspended in a dilute aqueous solution of the salt of aluminum and a mineral acid. In this regard, the aqueous reactant solution containing the pre-precipitated silica in suspension with the solution of the aluminum salt can be obtained by employing finely divided kaolin as a basic raw material and decomposing the kaolin in an aqueous suspension with sulfuric acid. The term "kaolin" is used herein to designate kaolin or like clays composed predominately of the mineral kaolinite. The decomposition of the kaolin be carried out in an open vessel if the kaolin has been previously calcined or if uncalcined kaolin is used it should be reacted with the acid in a closed vessel at pressures on the order of about 150 to 160 psi as disclosed in U.S. Pat. No. 2,848,346. The product of this decomposition process is essentially a dilute solution of aluminum sulfate containing very finely divided free silica in suspension.

The alkaline earth salts or hydroxides employed in the present invention include the salts or hydroxides of metals from Group 2a of the Periodic Table such as magnesium, calcium and barium. Preferred salts are the water-soluble salts such as the sulfates, carbonates, nitrates and chlorides. However others can be employed. It has been found that the use of calcium sulfate and magnesium sulfate are particularly advantageous and thus are preferred.

As indicated above, the unique pigments of the present invention may be advantageously employed or used in paper coatings, as reinforcing pigments in rubber compositions, in paints, inks, plastics and the like. Such pigments may, for example, be employed as reinforcing pigments in various rubber compositions including natural rubber and synthetic rubber compositions including butadiene 1,3-styrene copolymers, butadiene-acrylonitrile copolymers, butadiene-isobutylene copolymers and like synthetic elastomers. If employed as rubber pigments of the type described, the alkali silicates should contain from about 1 to 3.3 molar equivalents of $SiO_2$ per molar equivalent of $Na_2O$.

While the pigments produced in accordance with the invention may be employed in many applications, it has been unexpectedly discovered that the products obtained herein are particularly and excellently suited for use in paper. In this regard, pigments produced for paper fillers as described herein should employ alkali silicates having $SiO_2$ in a molar ratio of from about 1.5 to about 3.3 to the content of the alkali oxide ($Na_2O$).

Before turning to specific examples of the invention it should be noted that while the pH of the reacting medium is maintained in the range of about 8–12, a unique feature of the invention lies in the ability to produce a given product consistently even though the pH is varied during the reaction period or is held constant therethrough. Also by changing the pH of the reacting mass, pigments of different properties and characteristics can be produced. If desired, a neutral pigment can be produced by reducing the final pH of the slurry (after precipitation) to from about 5–6 by the addition of an excess of the aluminum salt, e.g., aluminum sulfate.

The following Examples will serve to further illustrate the present invention but it is expressly understood that they are not intended to limit it thereto. The Tables which follow the Examples set forth specific properties and characteristics of the products of the Examples not otherwise included therein.

EXAMPLE 1

A dilute alkali silicate solution was prepared by dissolving 4,740 lbs. of sodium silicate ($Na_2O$ . 2.5 $SiO_2$) in 2,370 gallons of water. A separate dilute solution of aluminum sulfate was prepared by dissolving 2,500 lbs. $Al_2(SO_4)_3 \cdot 14H_2O$ in 1,000 gallons of water. A 7,500 gal. reaction vessel provided with a propellor type agitator blade was charged with 1,540 gallons of water to which was added 1,282 lbs. of $MgSO_4 \cdot 7 H_2O$, and the agitator was started. The sodium silicate solution was charged to the reaction vessel at a rate of 46.5 GPM as a thin stream directly into the vortex formed by the rotating agitator blade. The addition of the sodium silicate solution was continued for a period of 16 minutes at the end of which time the pH of the reaction mass was 9.9. Thereafter, and with the silicate solution still being introduced, the aluminum sulfate solution was introduced at a rate of 25.1 GPM for an additional period of 35 minutes. The pH, during the simultaneous addition of the silicate solution and the alumimum salt, was reduced to about 9.5. At the end of the 51 minute reaction period all the silicate solution had been added. Thereafter the addition of the aluminum sulfate solution was continued until the final pH of the reaction mass was 8.8. This required an additional 5.0 minutes. The temperature of the solutions of the reactants introduced into the reaction vessel as well as the receiving medium was maintained at about 65°C throughout the reaction. After the pH of the reaction mass was reduced to 8.8 and all of the sulfate salt had been added, agitation of the reaction mass was continued for an additional 15 minutes. The precipitate was then separated by filtration and thoroughly washed with water at ambient temperatures. The resulting filter cake was dried at 110°C. The cake was pulverized in a hammer mill. The material so produced was a finely divided white particulate made up of particles less than 0.5 microns in diameter and about 97% of which were less than 0.05 microns in diameter. The specific gravity of the product was 2.2. The pour density was 9.5 lbs. per cubic foot, and the product had a BET surface area of $97_m{}^2/g$. From a chemical analysis of the product, the following formula was calculated:

$1.3\ Na_2O\ .\ 1.0\ Al_2O_3\ .\ 1.2\ MgO\ .\ 14.3\ SiO_2\ .\ 4.3\ H_2O$

EXAMPLE 2

The procedure of Example 1 was repeated except that the sodium silicate employed contained 1.4, 1.83, 2.34, 2.8, and 3.35 mols of $SiO_2$ per mol of $Na_2O$ respectively. The products obtained in this Example possessed properties similar to those of product of Example 1.

EXAMPLE 3

The general procedure of Example 1 was repeated except that magnesium chloride, magnesium hydroxide, and magnesium nitrate, were substituted for the magnesium sulfate of Example 1. The products obtained were substantially the same as that in Example 1.

EXAMPLE 4

The general procedure of Example 1 was repeated except that the aluminum sulfate and sodium silicate solutions were added simultaneously at the outset of the reaction or precipitation process. In addition the pH of the reaction mass was maintained constant (8.0) by adjusting the rate of addition of the two solutions. At the end of the reaction period, which required 51 minutes, the final pH of the slurry was increased to 9.5 by the addition of a dilute solution of the silicate. This required an additional 3 minutes. The product produced in this Example was substantially the same as the product of Example 1.

EXAMPLE 5

The general procedure of Example 1 was repeated except that alumimum chloride, aluminum nitrate and ammonium alum were substituted for the aluminum sulfate employed in Example 1. The products produced were substantially the same as that of Example 1.

EXAMPLE 6

The general procedure of Example 1 was repeated except that in a series of two test runs the reaction vessel was charged with 1,480 gallons of water to which was added 1,081 lbs. of calcium sulfate and 1,053 lbs. of calcium carbonate, respectively. After the precipitate was recovered by filtration, washed and dried, the product from test run No. 2 was reslurried and treated with sufficient HCl to reduce the pH of the slurry to about 3.5. Thereafter sufficient NaOH was added to the pigment slurry to increase the slurry pH to 8.8. The products obtained both prior to and after the additional treatment with NaOH possessed properties similar to that of the products of Example 1. In a series of further tests the above general procedures was repeated except that the amount of the calcium salt was varied and sodium silicate was substituted for the NaOH. (See Table 3 below).

EXAMPLE 7

The procedure of Example 1 was repeated except that the aluminum sulfate solution consisted of a slurry of finely divided precipitated silica in a solution of aluminum sulfate that was prepared by reacting 3250 lbs. of commercial kaolin with 4000 lbs. of 95% sulfuric acid in 1,000 gallons of water. The slurry was formed by agitating the kaolin with the sulfuric acid in a lead line autoclave at a temperature of 185°C for 10 hours. This reaction mass was cooled, discharged and made up to volume of 3,000 gallons by the addition of water. In examination, the finely divided precipitated silica particles suspended in the aqueous solution of aluminum sulfate showed that almost all the precipitated silica particles were less than 0.2 microns in its greatest dimension. The separate dilute solution of the sodium silicate and the aluminum sulfate solution containing the finely divided precipitate silica was then charged to the reaction vessel in the manner of Example 1. The precipitate was recovered by filtration with water and dried at 110°C. The filter cake was obtained in the form of soft lumps. On passing these lumps through the hammer mill a white powder was obtained, substantially all the particles of which were smaller than 0.5 microns in their greatest diameter.

EXAMPLE 8

The procedure of Example 1 was repeated except that the reaction vessel was charged with 1,500 gallons of water to which was added 1,085 lbs. of barium sulfate. The product produced in this Example was substantially the same as that of Example 1.

EXAMPLE 9

The procedure of Example 1 was repeated except that a mixture of $MgSO_4\ .\ 7\ H_2O$ and $CaCO_3$ (641 lbs. each or a total of 1,282 lbs.) was charged to the reaction vessel containing 1,540 gallons of water. The general properties of the product produced in this Example (e.g., particle size, surface area, density, etc.) were similar to those of the product of Example 1. Further properties of the pigment are shown in the Table set forth hereinbelow.

EXAMPLE 10

The general procedure of Example 1 was used to prepare 7 batches under varied reaction pH ranges. These Examples clearly establish the flexibility of the method of the invention to produce a given product consistently.

EXAMPLE 11

The general procedure of Example 1 was repeated except that the amount of $MgSO_4$ added to the receiving medium was varied (see Table 2 below) such that the final product contained varying amounts of magnesium based on the dry weight of the product.

EXAMPLE 12

The procedure of Examples 1–11 were repeated except that in a series of tests, sodium sulfate was added to the reaction medium prior to the introduction of the aluminum salt and the silicate solutions. The amounts of sodium sulfate added (in separate tests) was 1%, 2%, 5%, 10%, 15%, and 20% by weight, respectively, based on the weight of the water serving or forming said reaction medium. Less than about 2% did not produce any beneficial results whereas amounts greater than 15% were no more effective at 15%. It was established by the tests that the use of the sodium sulfate enhanced the rate of the reaction and provided a more homogenious reaction mixture to the extent that products having predetermined characteristics and/or properties could be produced with more consistency. In other words, a given end product, i.e., a product having specific properties, can be reproduced respectively. The properties of the products produced in this test were substantially the same as those listed in Tables 1-5 of U.S. Ser. No. 198,022, filed Nov. 5, 1971; now U.S. Pat. No. 3,798,046 which issued Mar. 19, 1974, which tables are reproduced hereinbelow for convenience. The microphotographs of the said application, U.S. Ser. No. 198,022, also deemed to be incorporated herein by reference.

TABLE I

CHEMICAL-PHYSICAL PROPERTIES OF PIGMENTS MODIFIED WITH MAGNESIUM AND CALCIUM

| | Pigment | Pigment (Elrepho) Brightness | % LOI | 20% pH | % 325 Residue | Valley Abrasion mg loss | Oil Absorption cc/100 g | Density, lbs./ft$^3$ Pour | Pack | BET Surface Area |
|---|---|---|---|---|---|---|---|---|---|---|
| Example 1 | MgSO$_4$ | 90.8 | 7.0 | 11.3 | 4.4 | 6.2 | 132 | 10.0 | 20.9 | 97 |
| | MgSO$_4$ | 91.6 | 8.1 | 10.9 | 3.7 | 2.7 | 140 | 8.6 | 18.3 | 114 |
| Example 2 | | | | | | | | | | |
| Example 2 | MgSO$_4$ | 91.6 | 8.1 | 11.4 | 5.1 | 5.5 | 156 | 10.0 | 21.6 | 106 |
| Example 2 | MgSO$_4$ | 91.0 | 7.6 | 11.2 | 3.6 | 10.9 | 135 | 10.4 | 22.4 | 102 |
| Example 2 | MgSO$_4$ | 91.1 | 7.5 | 11.3 | 4.8 | 7.5 | 140 | 10.0 | 17.5 | 122 |
| Example 2 | MgSO$_4$ | 91.7 | 8.0 | 11.3 | 0.9 | 8.0 | 136 | 10.8 | 22.0 | 105 |
| Example 3 | MgCl$_2$ | 90.4 | 9.7 | 10.6 | 0.8 | 4.3 | 138 | 10.2 | 20.1 | 142 |
| Example 3 | Mg(OH)$_2$ | 90.8 | 9.2 | 10.4 | 2.4 | 7.8 | 131 | 10.2 | 22.3 | 142 |
| Example 3 | MgNO$_3$ | 91.0 | 9.6 | 10.1 | 1.8 | 6.8 | 135 | 12.0 | 25.0 | 176 |
| Example 4 | MgSO$_4$ | 91.3 | 8.1 | 11.0 | 5.3 | 6.6 | 148 | 9.2 | 20.1 | 119 |
| Example 6 | CaSO$_4$ | 90.8 | 8.5 | 11.3 | 1.25 | 6.0 | 132 | 10.1 | 20.8 | 105 |
| Example 6 | CaCO$_3$ | 91.0 | 9.3 | 10.9 | 0.81 | 8.0 | 170 | 9.9 | 22.0 | 111 |
| Example 8 | BaSO$_4$ | 91.2 | 9.0 | 11.3 | 1.01 | 6.5 | 160 | 10.2 | 23.2 | 112 |
| Example 9 | MgSO$_4$ & CaCO$_3$ | 91.4 | 8.9 | 11.0 | 1.04 | 7.5 | 156 | 10.4 | 20.4 | 130 |

TABLE 2

FINE PAPER PROPERTIES OF PIGMENTS MODIFIED WITH MAGNESIUM

| Pigment | % Mg in Pigment | % Solids of Wet Cake | % FIL | % Pigment Retention | TAPPI Brightness | TAPPI Opacity |
|---|---|---|---|---|---|---|
| Unfilled Zeolex 23-Control | | | — | — | 87.0 | 80.0 |
| Example 11 | None | 28.4 | 3 | 56 | 88.0 | 81.2 |
| | | | 6 | 52 | 88.3 | 82.1 |
| | | | 9 | 50 | 88.9 | 83.0 |
| Example 11 | 0.43 | 26.4 | 3 | 49 | 88.0 | 81.6 |
| | | | 6 | 53 | 88.6 | 82.9 |
| | | | 9 | 50 | 89.3 | 83.8 |
| Example 11 | 0.49 | 27.5 | 3 | 48 | 87.9 | 81.6 |
| | | | 6 | 45 | 88.5 | 83.0 |
| | | | 9 | 42 | 88.9 | 83.9 |
| Example 11 | 0.43 | 29.3 | 3 | 48 | 88.0 | 81.6 |
| | | | 6 | 53 | 88.8 | 83.1 |
| | | | 9 | 50 | 89.0 | 84.1 |
| Example 11 | 0.55 | 26.4 | 3 | 57 | 88.0 | 81.5 |
| | | | 6 | 52 | 88.6 | 82.7 |
| | | | 9 | 49 | 89.0 | 83.6 |
| Example 11 | 0.56 | 29.7 | 3 | 51 | 88.2 | 81.6 |
| | | | 6 | 47 | 88.9 | 82.9 |
| | | | 9 | 44 | 89.3 | 83.9 |
| | | | — | — | 88.4 | 79.3 |
| Example 11 | 1.5 | 28.7 | 3 | 53 | 88.9 | 81.6 |
| | | | 6 | 51 | 89.3 | 83.2 |
| | | | 9 | 52 | 89.5 | 84.0 |
| Example 11 | 3.3 | 24.0 | 3 | 48 | 88.9 | 81.7 |
| | | | 6 | 46 | 89.3 | 83.6 |
| | | | 9 | 48 | 89.5 | 84.9 |
| Example 11 | 2.7 | 26.0 | 3 | 48 | 89.0 | 81.2 |
| | | | 6 | 47 | 89.5 | 82.8 |
| | | | 9 | 47 | 89.8 | 83.8 |
| Example 11 | 2.7 | 24.1 | 3 | 44 | 89.0 | 81.5 |
| | | | 6 | 42 | 89.5 | 82.9 |
| | | | 9 | 47 | 89.7 | 83.5 |
| Example 11* | 1.8 | 27.3 | 3 | 44 | 89.2 | 81.0 |
| | | | 6 | 44 | 89.8 | 83.3 |
| | | | 9 | 42 | 90.2 | 84.2 |
| Example 11 | 8.0 | 26.6 | 3 | 45 | 89.2 | 81.7 |
| | | | 6 | 44 | 89.6 | 83.7 |
| | | | 9 | 42 | 90.0 | 84.9 |

*Note: in this test, pigment reslurried and treated in accordance with Example 6)

TABLE 3

FINE PAPER PROPERTIES OF PIGMENTS MODIFIED WITH CALCIUM AND BARIUM

| Pigment | % Ca in Pigment | % Solids of Wet Cake | %FIL | % Pigment Retention | TAPPI Brightness | TAPPI Opacity |
|---|---|---|---|---|---|---|
| Unfilled | — | — | | | 88.0 | 80.3 |
| Zeolex 23 (Control) | None | 28.6 | 3 | 55 | 88.7 | 82.0 |
| | | | 6 | 53 | 89.0 | 82.5 |
| | | | 9 | 52 | 89.2 | 84.3 |
| Example 6 (CaSO$_4$) | 0.4 | 24.3 | 3 | 52 | 88.7 | 82.2 |
| | | | 6 | 57 | 89.1 | 83.7 |
| | | | 9 | 56 | 89.4 | 84.7 |
| Example 6 (CaSO$_4$) | 0.55 | 23.6 | 3 | 47 | 88.9 | 82.1 |
| | | | 6 | 49 | 89.1 | 83.6 |
| | | | 9 | 46 | 89.4 | 84.7 |
| Example 6 (CaSO$_4$) | 4.1 | 25.4 | 3 | 47 | 89.2 | 82.0 |
| | | | 6 | 49 | 89.4 | 83.4 |
| | | | 9 | 47 | 89.7 | 84.6 |
| Example 6 (CaCO$_3$) | 4.3 | 25.2 | 3 | 47 | 89.2 | 82.0 |
| | | | 6 | 49 | 89.4 | 83.3 |
| | | | 9 | 47 | 89.7 | 84.4 |
| Example 6 (CaSO$_4$) | 4.6 | 28.8 | 3 | 47 | 89.6 | 82.4 |
| | | | 6 | 49 | 89.9 | 84.1 |
| | | | 9 | 46 | 89.9 | 85.5 |
| Example 6 (CaCO$_3$) | 3.9 | 29.0 | 3 | 47 | 89.1 | 82.2 |
| | | | 6 | 47 | 89.4 | 83.8 |
| | | | 9 | 46 | 89.6 | 85.1 |

| Pigment | % Ba in Pigment | % Solids of Wet Cake | %FIL | % Pigment Retention | TAPPI Brightness | TAPPI Opacity |
|---|---|---|---|---|---|---|
| Example 8 (BaSO$_4$) | 4.0 | 28.7 | 3 | 46 | 89.1 | 82.2 |
| | | | 6 | 49 | 89.4 | 84.0 |
| | | | 9 | 46 | 89.6 | 86.3 |

TABLE 4

PHYSICAL PROPERTIES AND REACTION CONDITIONS OF PIGMENTS MODIFIED WITH MAGNESIUM IN ACCORDANCE WITH EXAMPLE 10

| Run No. | Min. Excess Silicate | Prec. pH Range | Final pH | % LOI | Valley Abrasion mg-loss | % 325 screen residue | BET Surface area m$^2$/g | Oil Absorption cc/100g | Pigment Brightness |
|---|---|---|---|---|---|---|---|---|---|
| 1 | 16 | 10.0–10.0 | 8.8 | 6.52 | 4.5 | 0.24 | 110 | 112 | 93.3 |
| 2 | 16 | 10.0–9.0 | 8.8 | 6.81 | 5.6 | 0.16 | 101 | 110 | 93.5 |
| 3 | 16 | 10.0–9.0 | 8.8 | 6.53 | 6.5 | 0.12 | 71 | 108 | 93.3 |
| 4 | 20 | 10.5–10.5 | 8.8 | 6.42 | 5.6 | 0.48 | 124 | 118 | 92.7 |
| 5 | 20 | 10.5–9.5 | 8.8 | 6.43 | 4.2 | 0.12 | 108 | 120 | 93.3 |
| 6 | 20 | 10.5–9.5 | 8.8 | 6.55 | 2.9 | 0.14 | 82 | 110 | 93.5 |
| 7 | 6 | 8.0 –8.0 | 9.8 | 7.06 | 4.1 | 0.06 | 75 | 137 | 94.5 |
| 8 | 6 | 8.0 –9.0 | 9.8 | 6.38 | 2.9 | 0.04 | 59 | 127 | 94.1 |
| 9 | 6 | 8.0 –9.8 | 9.8 | 6.56 | 1.5 | 0.10 | 61 | 136 | 93.2 |

TABLE 5

FINE PAPER PROPERTIES OF DRIED AND MILLED MAGNESIUM MODIFIED SILICATE PIGMENTS PRODUCED IN ACCORDANCE WITH EXAMPLE 10

| Run No. | Minutes Excess Silicate | Prec. pH Range | Final pH | % Filler | % Pigments Retention | Tappi Brightness | Pigments Tappi Opacity |
|---|---|---|---|---|---|---|---|
| Control | | | | unfilled | | 85.6 | 82.0 |
| 1 | 16 | 10.0–10.0 | 8.8 | 3 | 50 | 87.1 | 85.0 |
| | | | | 6 | 49 | 87.9 | 87.0 |
| | | | | 9 | 48 | 88.5 | 88.3 |
| 2 | 16 | 10.0–9.0 | 8.8 | 3 | 51 | 87.1 | 85.0 |
| | | | | 6 | 51 | 87.9 | 87.2 |
| | | | | 9 | 50 | 88.5 | 88.5 |
| 3 | 16 | 10.0–9.0 | 8.8 | 3 | 51 | 87.1 | 85.0 |
| | | | | 6 | 52 | 87.9 | 87.2 |
| | | | | 9 | 52 | 88.6 | 88.6 |
| 4 | 20 | 10.5–10.5 | 8.8 | 3 | 50 | 87.1 | 84.8 |
| | | | | 6 | 50 | 87.9 | 86.9 |
| | | | | 9 | 47 | 88.5 | 88.2 |
| 5 | 20 | 10.5–9.5 | 8.8 | 3 | 50 | 87.1 | 84.8 |
| | | | | 6 | 50 | 87.9 | 86.9 |
| | | | | 9 | 48 | 88.5 | 88.1 |
| 6 | 20 | 10.5–9.5 | 8.8 | 3 | 48 | 87.1 | 85.0 |
| | | | | 6 | 47 | 88.0 | 87.1 |
| | | | | 9 | 50 | 88.6 | 88.5 |
| 7 | 6 | 8.0 –8.0 | 9.8 | 3 | 50 | 87.3 | 85.4 |
| | | | | 6 | 49 | 88.3 | 87.6 |
| | | | | 9 | 50 | 89.1 | 89.0 |
| 8 | 6 | 8.0 –9.0 | 9.8 | 3 | 50 | 87.3 | 85.4 |
| | | | | 6 | 48 | 88.3 | 87.6 |
| | | | | 9 | 50 | 89.0 | 89.0 |

TABLE 5-continued

FINE PAPER PROPERTIES OF DRIED AND MILLED MAGNESIUM MODIFIED SILICATE PIGMENTS PRODUCED IN ACCORDANCE WITH EXAMPLE 10

| Run No. | Minutes Excess Silicate | Prec. pH Range | Final pH | % Filler | % Pigments Retention | Tappi Brightness | Pigments Tappi Opacity |
| --- | --- | --- | --- | --- | --- | --- | --- |
| 9 | 6 | 8.0 –9.8 | 9.8 | 3 | 49 | 87.1 | 85.2 |
|  |  |  |  | 6 | 48 | 88.0 | 87.3 |
|  |  |  |  | 9 | 49 | 88.6 | 88.7 |

What is claimed is:

1. A method for producing finely-divided, precipitated alumino-silicate particulates, said method comprising the steps of introducing dilute aqueous solutions of an alkali silicate and a water soluble acid salt of aluminum into an agitated aqueous receiving medium containing an alkaline earth salt or hydroxide and sodium sulfate; said sulfate being present in an amount within the range of from about 2 to 15% by weight, based on the weight of the water forming said aqueous reaction medium; maintaining the resulting reaction mass at a pH in the range of about 8 to 12 during the reaction to thereby produce in said fluid reaction medium very fine white precipitate particulates composed principally of oxides of an alkaline earth metal, an alkali metal, aluminum and silicon, said finely divided precipitated particulates all being less than 1 micron in diameter.

2. The method in accordance with claim 1 wherein the initial volume of said aqueous receiving medium is at least half the combined volume of said solutions of the alkali metal silicate and the aluminum salt and wherein said alkaline earth salt or hydroxide is present in said receiving medium in an amount such that the alkaline earth metal comprises from about 0.1 to 8.0% based on the dry weight of the precipitated particulate.

3. The method in accordance with claim 1 wherein the aqueous reaction mass is maintained at a pH in the range of about 8 to 12 while combining said solutions of the alkali silicate and the aluminum salt; said method further comprising reducing the pH of the fluid reaction medium to a pH of between about 8 to 9.5 at the end of the reaction period and thereafter further reducing the pH of the reaction medium by the addition of an excess of said aluminum salt to from about 5–6 to thereby obtain a neutral pigment.

4. The method in accordance with claim 1 wherein the alkaline earth salt is a water soluble salt of calcium, magnesium, or barium.

5. The method in accordance with claim 1 wherein said aluminum salt includes a finely divided precipitated silica suspended in an aqueous dilute solution thereof.

6. A method for producing finely-divided, precipitated alkaline earth alkali metal alumino-silicates having particular utility for use in paper, said method comprising the steps of introducing a dilute aqueous solution of an alkali silicate selected from the group consisting of sodium and potassium silicates into an agitated aqueous receiving medium containing an alkaline earth salt selected from the group consisting of the water soluble salts of magnesium, calcium, and barium or mixtures thereof and as a promoter or catalyst, sodium sulfate; said sulfate being present in an amount within the range of from about 2 to 15% by weight, based on the weight of the water forming said aqueous receiving medium; continuing the addition of said alkali silicate to said receiving medium until the pH of said receiving medium is at least 8 and for a period of time to effect an initial reaction between said alkali silicate and said alkaline earth salt; introducing a dilute solution of a water soluble acid salt of aluminum into said receiving medium while continuing the addition of said alkali silicate; said simultaneous addition of the alkali silicate and aluminum salt being controlled such that the pH of the fluid reaction medium is in the range of 8 to 12 to thereby produce in said medium a very fine white precipitated particulates composed principally of oxides of said alkaline earth metal, said alkali metal, aluminum and silicon; adjusting the pH of the fluid reaction medium to between about 8 to 10, and separating, drying, and disintegrating said precipitates to obtain a pigment having a particle size of not greater than 1 micron in diameter.

7. The method in accordance with claim 6 wherein said dilute solution of the aluminum salt includes finely divided precipitated silica suspended therein.

* * * * *